United States Patent [19]
Stuart

[11] Patent Number: 6,044,982
[45] Date of Patent: *Apr. 4, 2000

[54] LEVER CLAMP

[75] Inventor: Timothy Scott Stuart, Potomac, Md.

[73] Assignee: Stuart Shelving, LLC, Potomac, Md.

[*] Notice: This patent is subject to a terminal disclaimer.

[21] Appl. No.: 09/161,259

[22] Filed: Sep. 26, 1998

Related U.S. Application Data

[60] Provisional application No. 60/061,045, Oct. 4, 1997, and provisional application No. 60/064,042, Nov. 3, 1997.

[51] Int. Cl.[7] .......................... A47B 96/06; A47B 65/00; E04G 3/00; F16M 11/00; G09F 7/18
[52] U.S. Cl. .......................... 211/43; 211/184; 248/228.6; 248/230.6; 248/231.71
[58] Field of Search .......................... 248/228.6, 230.6, 248/231.71, 229.15, 229.25; 211/43, 184

[56] References Cited

U.S. PATENT DOCUMENTS

| | | |
|---|---|---|
| 305,863 | 9/1884 | Thompson . |
| 338,288 | 3/1886 | Normandy . |
| 388,674 | 8/1888 | Harrington . |
| 436,704 | 9/1890 | Green . |
| 452,673 | 5/1891 | Hunter . |
| 587,101 | 7/1897 | Lombard et al. . |
| 607,890 | 7/1898 | Smith . |
| 607,891 | 7/1898 | Smith . |
| 668,961 | 7/1901 | Roseboom . |
| 679,054 | 7/1901 | Kraushaar . |
| 934,676 | 9/1909 | Langslow . |
| 1,108,692 | 8/1914 | Burd . |
| 1,224,127 | 5/1917 | Bartlett . |
| 1,675,269 | 6/1928 | Hine . |
| 2,136,109 | 11/1938 | Kress . |
| 2,946,457 | 7/1960 | Pierce . |
| 3,744,645 | 7/1973 | Hochman . |
| 3,776,388 | 12/1973 | Mattheis . |
| 3,949,880 | 4/1976 | Fortunato . |
| 4,618,063 | 10/1986 | Mendenhall . |
| 5,036,988 | 8/1991 | Rouire . |
| 5,344,115 | 9/1994 | Mayne et al. .......................... 248/514 |
| 5,655,670 | 8/1997 | Stuart . |

Primary Examiner—Ramon O. Ramirez
Assistant Examiner—Jerome DeLuca

[57] ABSTRACT

A lever clamp which can be securely mounted at selected locations along a shelf or similar object includes a body member containing a slot for receiving the shelf, and a lever or clamping member pivotally connected with the body member which serves to clamp the clamp to the shelf when pivoted to an upright position. Items such as a lamp or dispenser, but not including a stop member, partition or banding and binning, are connected with the top of the clamping member to attach such objects to the shelf. A L-shaped body member is also disclosed in which a portion of the clamping member is connected with a stop member, partition, lamp or other item to attach said items to a shelf. Also disclosed are a flex member for the lever clamp which serves to increase the clamping force on the shelf as the load applied to the clamping member increases as well as latching means for the lever clamp and the previously disclosed clamping bookend. A one-piece lever clamp is also disclosed.

10 Claims, 16 Drawing Sheets

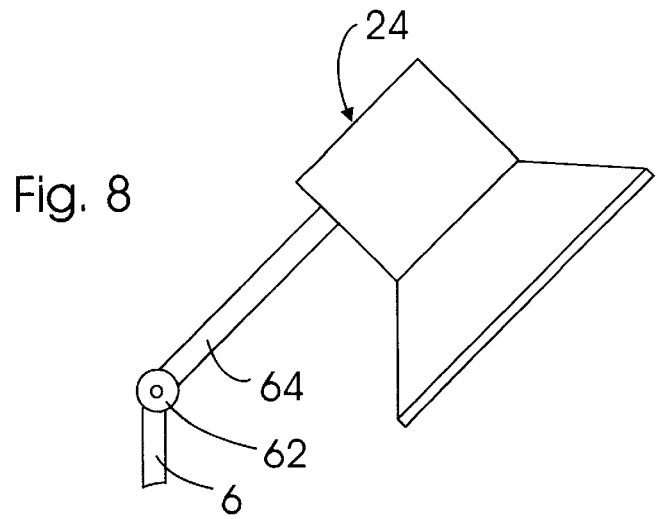
Fig. 8
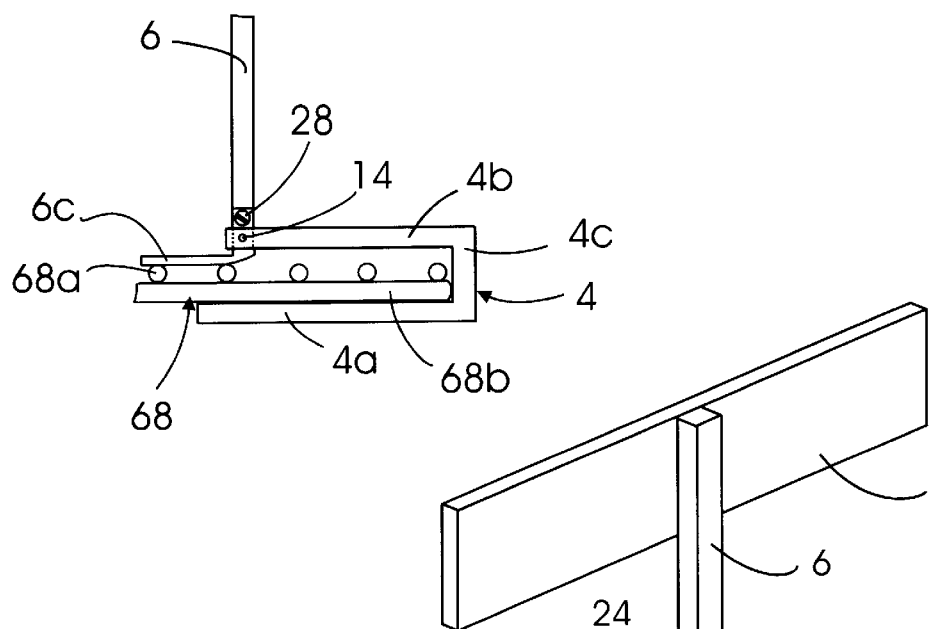
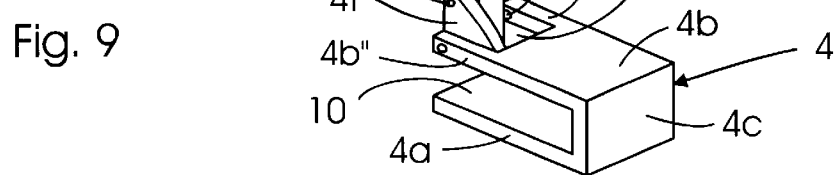
Fig. 9

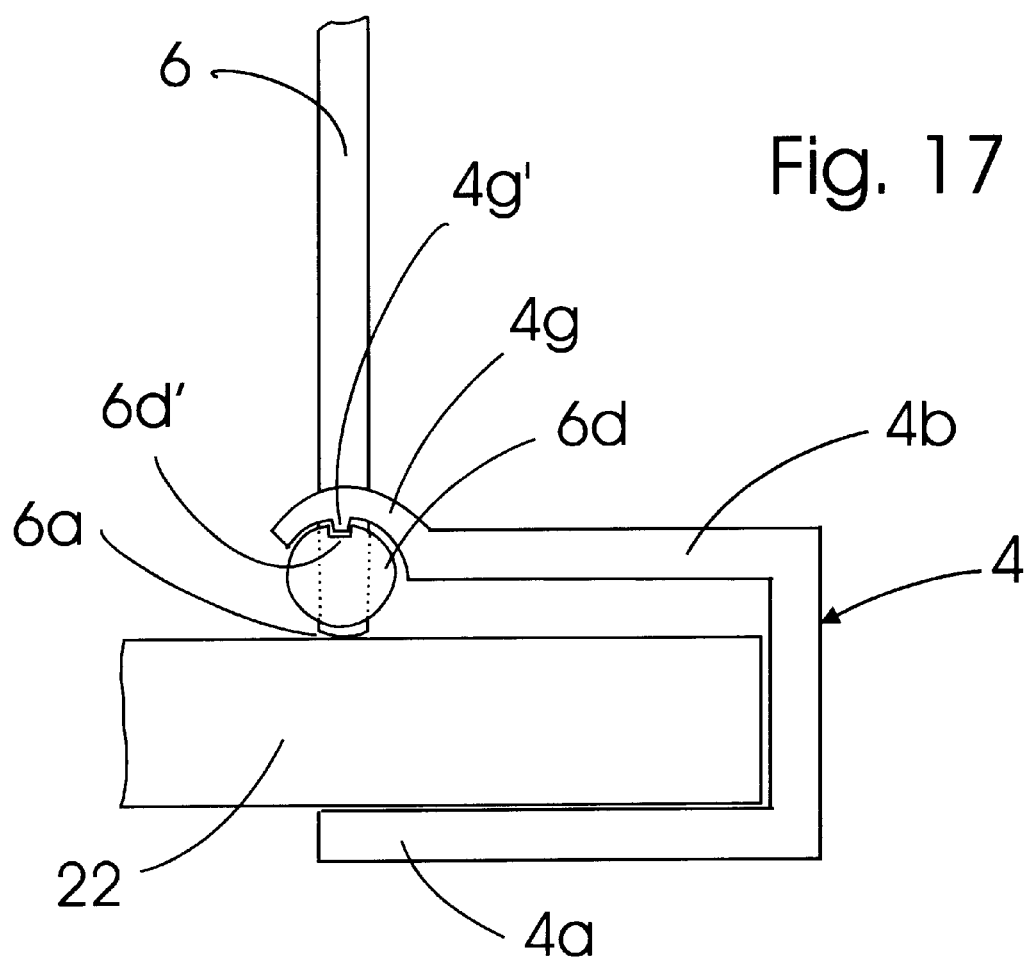

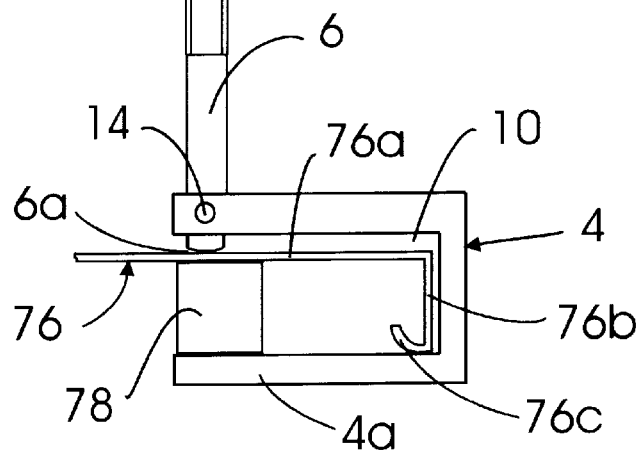

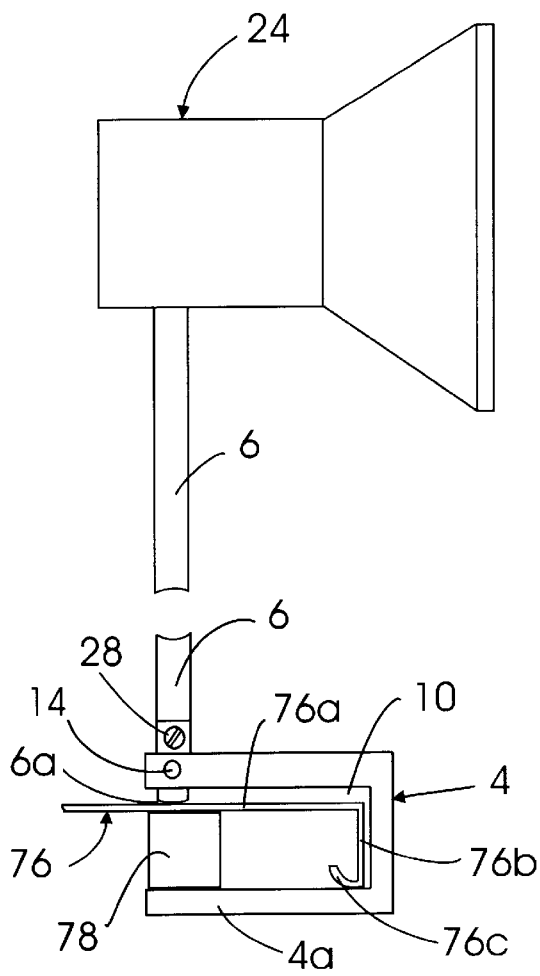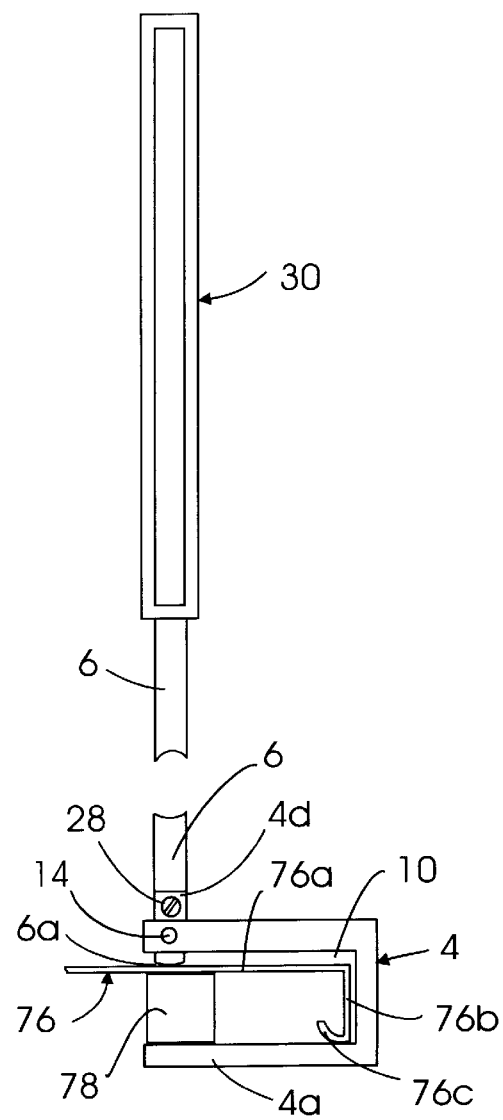

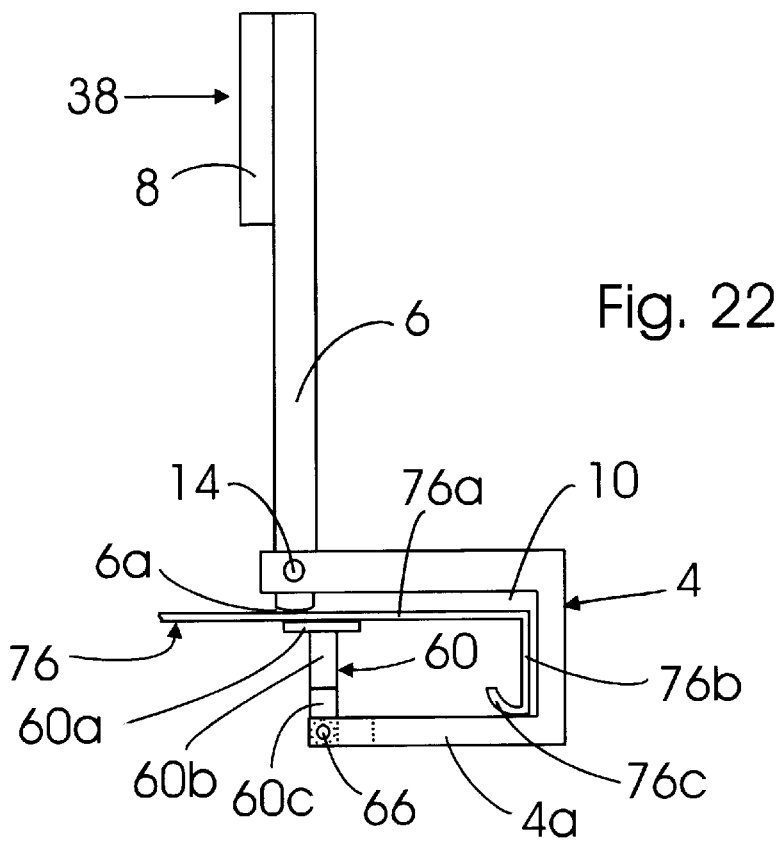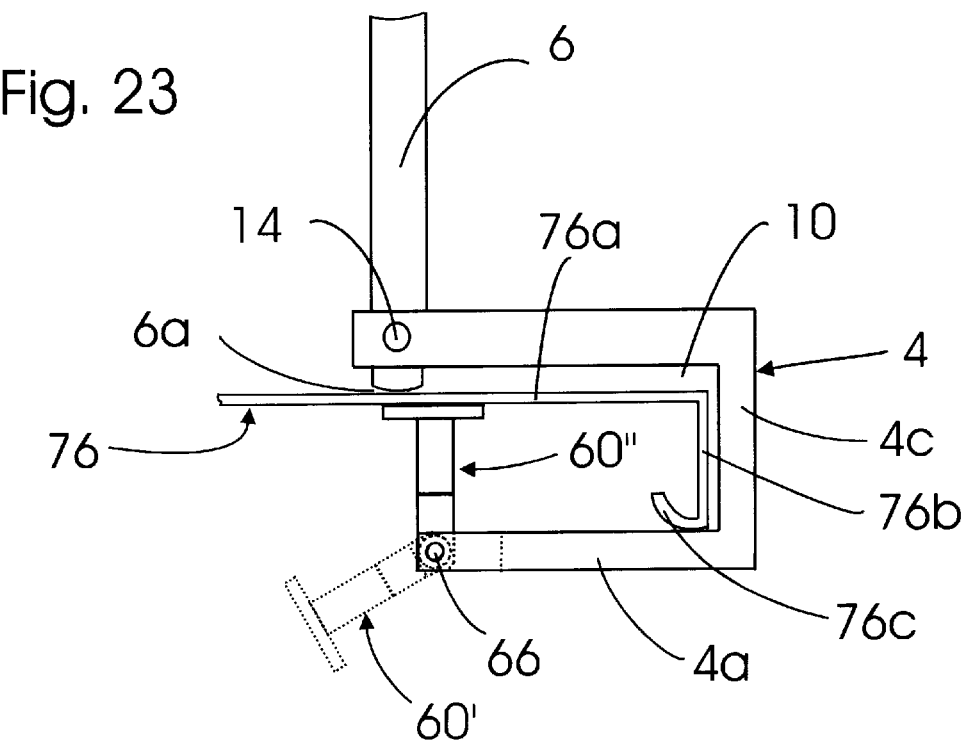

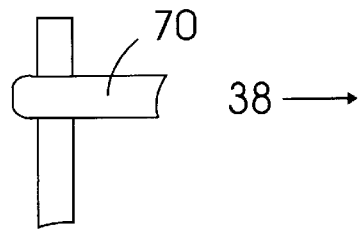
Fig. 26
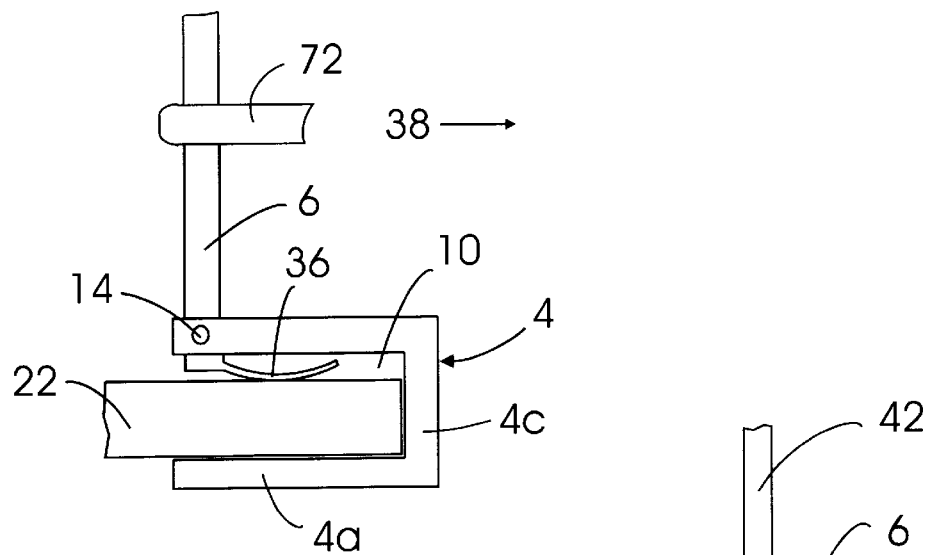
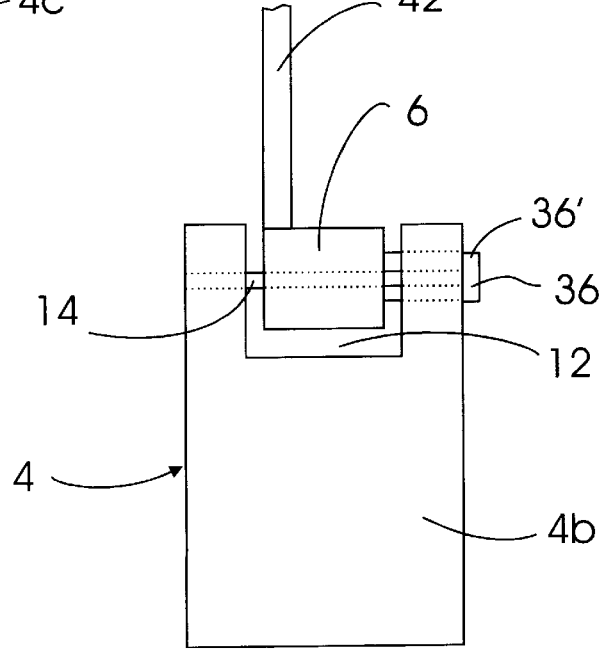
Fig. 27

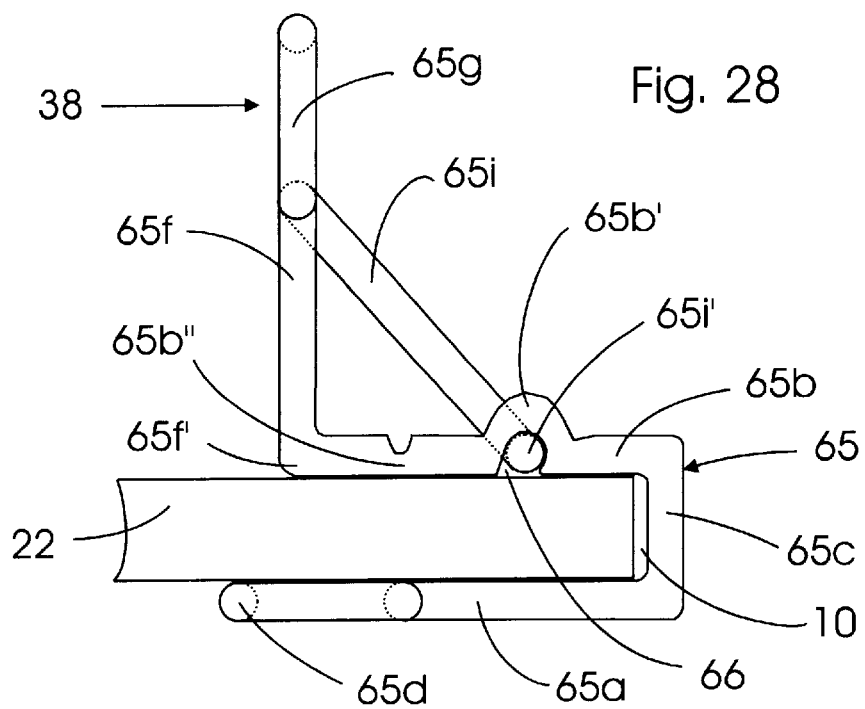
Fig. 28
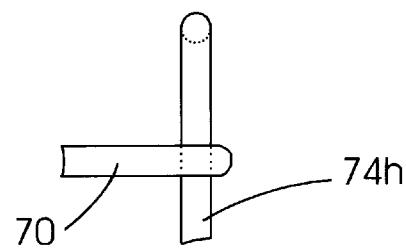
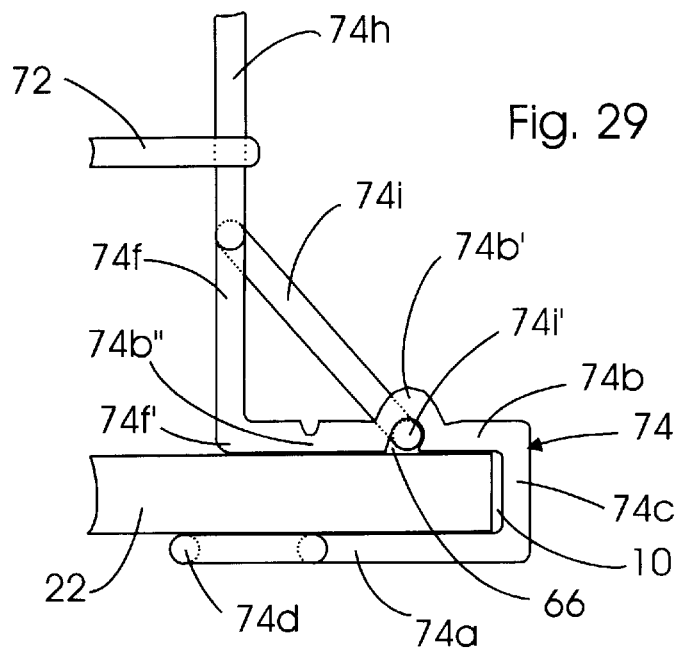
Fig. 29

LEVER CLAMP

This patent application references a U.S. Pat. No. 5,655,670, to Stuart a U.S. patent application Ser. No. 09/137,891 by Stuart and two Provisional Patent Applications Ser. No. 60/061,045 by Stuart filed on Oct. 4, 1997 and Ser. No. 60/064,042 filed on Nov. 3, 1997.

BACKGROUND OF THE INVENTION

Items such as signs, pencil sharpeners, lamps and trays are often attached to objects such as shelves, desktops, and bookcases. The problem of firmly but reversibly fastening such items to shelves and the like is a longstanding problem.

The present invention relates to a lever clamp utilizing a lever or clamping member to firmly but reversibly attach such items to such objects at a selected location.

BRIEF DESCRIPTION OF THE PRIOR ART

Various clamps for attaching signs, partitions, book stops, pencil sharpeners, lamps, and similar items to shelves, desks, bookcases and the like are described in the patented prior art. The U.S. Pat. No. 338,288, to Normandy for example, discloses a clamp with a nonlatching screw fastener for attaching a clothes drier to a shelf, while U.S. Pat. No. 587,101 to Lombard and Maynard discloses a shelf bracket with a nonlatching screw fastener.

The U.S. Pat. No. 305,863, to Thompson U.S. Pat. No. 388,674, Harrington and U.S. Pat. No. 452,673 Hunter disclose clip-on type partitions and bookends. These clip-on bookends engage the edge of a bookshelf and are generally formed as an integral unit including a base portion, a resilient clip portion, and a book support portion. The resilient clip portion releasably secures the support portion to the bookshelf and the support portion bears against a row of books. The clips for these bookends often extend a great distance along the bottom of the shelf in order to provide structural support and to provide a tight grip on the shelf. The clip, however, is often unsightly and in some cases, significantly protrudes from the underside of the shelf thus interfering with the use of the space below the shelf. Another drawback of clip-on bookends is that they generally do not provide a strong connection with the shelf and tend to slip, particularly when supporting heavy loads, such as large books.

Book supports using a thumb screw or cam are disclosed in the U.S. Pat. Nos. 607,890 and 607,891 to Smith. These devices use a clamp and a thumb screw or cam which tightens the partition in place by pressing a block against the top of the shelf. The problem with this type of book support is that the locking arrangements are overly complicated and unsightly and the thumb screws tend to loosen over time. These book supports are not believed to be in commercial use.

The use of a nonlatching screw fastener in a clamp for racks and the like was disclosed in the U.S. Pat. No. 934,676, to Langslow while the use of a nonlatching screw fastener with a dining table attachment was disclosed in the U.S. Pat. No. 1,108,692 to Burd. The use of a nonlatching screw fastener to hold a display tray to a shelf was disclosed in the U.S. Pat. No. 3,776,388 to Mattheis. The problem with unlatched screw fasteners is that they tend to loosen over time, and in an attempt to overcome this shortcoming, users may tend to over tighten the screw fastener and thus cause damage to the surfaces in contact with the screw fastener.

A clamping bookend has recently been disclosed in a U.S. Pat. No. 5,655,670 to Stuart. Latching means were also disclosed. The clamping bookend overcomes many of the drawbacks of earlier bookends and described a bookend suitable for use as a bookend, partition, and as a support for banding and binning.

A screw fastener clamp for attaching items such as partitions, lamps, signs and book stops was recently disclosed in a U.S. patent application Ser. No. 09/13789 by Stuart. This new screw fastener clamp, with a simple fastening mechanism and an optional latch, was developed in order to provide an alternative approach for overcoming these and other drawbacks of the prior devices.

The present invention was developed in order to provide a clamp suitable for supporting items in addition to bookends, partitions and banding and binning. This lever clamp utilizes a lever or clamping member for firmly and reversibly attaching items such as signs, pencil sharpeners, and dispensers to shelves, desktops, bookcases and the like at a selected location.

The clamping bookend disclosed in the U.S. Pat. No. 5,655,670, to Stuart the screw fastener clamp disclosed in the U.S. patent application Ser. No. 09/137,891 by Stuart and the lever clamp disclosed herein can be used as needed to best meet the needs for specific applications.

SUMMARY OF THE INVENTION

Accordingly, it is a primary object of the present invention to provide a clamp for firmly and reversibly attaching items such as sign holders, pencil sharpeners, trays, lamps and dispensers to shelves, desks, bookcases and the like at a selected location. It is a more specific object of the invention to provide a clamp for firmly and reversibly attaching such items using a clamp with a lever or clamping member.

It is another object of the invention to provide latching means for the lever clamp and additional latches for the previously disclosed clamping bookend.

It is also a more specific object of the invention to provide a lever clamp having a body member containing a slot for receiving the shelf or similar object and a clamping member connected to a pencil sharpener, sign holder, or similar item, with such clamping member also being pivotally connected with the body member for movement between a lower disengaged position and a raised clamped position, whereby when the clamping member is pivoted from the lower disengaged position to the upright clamping position, the clamp is firmly fastened to the shelf or similar object.

It is a further object of the invention to provide a lever clamp having a lever or clamping member wherein the body member is formed in different embodiments as needed for firm and reversible attachment to different types of objects, especially wire shelves, metal shelves, desktops, and wooden shelves.

It is another object of the invention to provide a clamp having a clamping member wherein the body member can be formed in different embodiments as needed for clamping to objects oriented in different planes, e.g., vertically and horizontally.

It is a further object of the invention to provide a lever clamp having a clamping member wherein the body member has a C-shaped configuration and includes a pair of generally parallel spaced leg portions and a connecting portion defining a slot which is adapted to receive the shelf, desktop, or the like.

It is a further object of the invention to provide a lever clamp wherein the body member has a L-shaped configuration, with the connecting member and one of the leg portions serving with the clamping member to define a slot which is adapted to receive the shelf or similar object.

It is a further object of the invention to provide a set screw latch such that, when the clamping member is in the clamped position, a set screw engages the clamping member and holds said clamping member in the upright clamping position.

It is a more specific object of the invention to provide an alternative latch with a protrusion or nib which, when the clamping member is rotated into the clamped position, locks the clamping member in place.

It is another object of the invention to provide another alternative latch formed of a collar or locking ring such that, when the clamping member is in the raised clamping position, said collar fits over said clamping member and at least one raised portion of the body member and thus holds said clamping member in place.

It is a further object of the invention to provide yet another alternative latch formed of a brace that holds the clamping member in the raised clamping position.

It is a further object of the invention to provide still yet another alternative latch for a clamp formed of a notch in a cylindrical portion of the clamping member and a protrusion on a curved portion of the upper leg portion.

It is another object of the invention to provide a clamp suitable for use on a wire shelf.

It is a further object of the invention to provide yet another alternative latch for a clamp fastened to a wire shelf with said latch formed of a hook fastener connected to an extension at the lower end of the clamping member.

It is a further object of the invention to provide a clamp having a clamping member with a shaft for attaching a sign or other items and a flex member such that an increased load increases the grip on the shelf.

It is a further object of the invention to provide a clamping bookend having a partitioning divider and a flex portion at the lower end of the clamping member with the flex member generally oriented perpendicularly to said partitioning divider to provide a better grip on the shelf.

It is a still further object of the invention to provide a clamp suitable for use with a shelf made from sheet metal.

It is a further object of the invention to provide a clamp having a locking spacer arm for use with a shelf made from sheet metal.

It is a further object of the invention to provide a clamping bookend as previously disclosed in U.S. Pat. No. 5,655,670 to Stuart but formed from a single piece of wire or similar material and having an integral hinge and a brace latch.

It is a further object of the invention to provide a lever clamp formed of a single piece of wire or similar material and having an integral hinge and a brace latch.

It is another object of the present invention to provide a clamp for firmly and reversibly attaching items such as signs, pencil sharpeners, lamps and dispensers to shelves, desks, bookcases and the like that is easily and inexpensively manufactured, durable and easy to use.

BRIEF DESCRIPTION OF THE DRAWINGS

Other objects and advantages of the invention will become apparent from a study of the following specification when viewed in the light of the accompanying drawings, in which:

FIG. 3 is a side view of a clamp having a clamping member forming one side of the slot for receiving a shelf, a L-shaped body member, a set screw latch and a dispenser for store coupons or the like;

FIG. 8 is a side view of a clamp for a wire shelf having an extension at the lower end of the clamping member, a C-shaped body member, a set screw latch, and an adjustable swivel, support and lamp at the upper end of said clamping member;

FIG. 9 is a front perspective view of a clamping bookend with a clamping member, a C-shaped body member, nib latch, and a book stop at the upper end of said clamping member;

FIG. 17 is a side view of a clamp having a latch formed of a cylindrical portion with a notch on the clamping member and a curved arm with a protrusion on the upper leg portion of the body member;

FIG. 18 is a side view of a clamping bookend having a large pad for use with a metal shelf;

FIG. 19 is a side view of a lever clamp having a large pad for use with a metal shelf;

FIG. 20 is a side view of a lever clamp for a metal shelf, having a clamping member, pad, set screw latch, and a lamp;

FIG. 21 is a side view of a lever clamp for a metal shelf having a clamping member, set screw latch, pad, and a sign holder at the upper end of said clamping member;

FIG. 22 is a side view of a clamping bookend having a locking spacer arm at the end of the lower leg portion of the body member;

FIG. 23 is a side view of a lever clamp showing the operation of the spacer arm;

FIG. 26 is a side view of a clamp with a clamping member having a flex portion at the lower end of said clamping member and connectors for supporting one end of a sign at the upper end of said clamping member;

FIG. 27 is a top view of a clamping bookend having a partition on the upper end of the clamping member and a flex member at the lower end of said clamping member, with said flex member oriented generally perpendicularly to said partition;

FIG. 28 is a side view of a clamping bookend formed from a single piece of wire or similar material having a stop, an integral hinge and a brace latch;

FIG. 29 is a side view of a lever clamp formed from a single piece of wire or similar material having an integral hinge, brace latch and a shaft portion with connectors for supporting one end of a sign.

DETAILED DESCRIPTION

Figure 1:
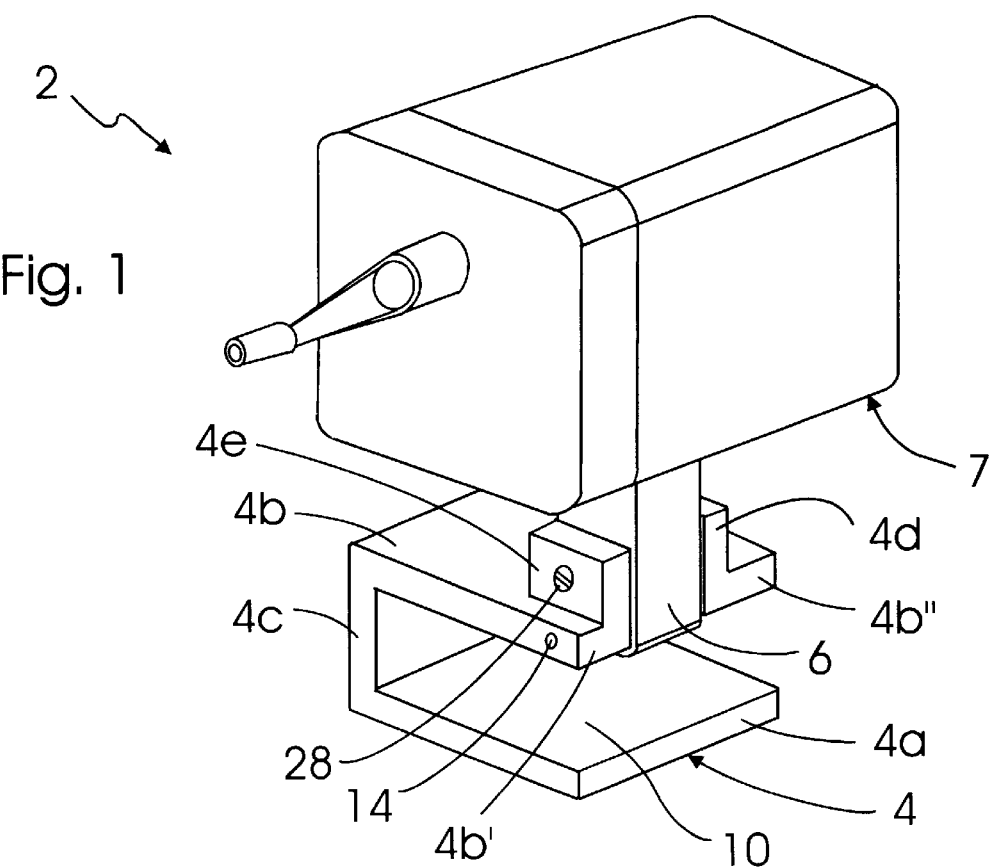
FIG. 1 is a rear perspective view of a lever clamp having a clamping member, a C-shaped body member, a set screw latch and a pencil sharpener at the upper end of said clamping member according to the invention.

The lever clamp is suited for fastening items such as lamps, dispensers, pencil sharpeners, and sign holders to shelves and the like. Referring first to FIG. 1, there is shown a lever clamp 2 with a pencil sharpener 7, with the clamp having a body member 4, lever or clamping member 6, pivot pin 14 and set screw latch 28. The body member, clamping member, pivot pin, set screw latch, and pencil sharpener are formed of strong durable materials such as wood, metal, or plastic. The body member 4 includes a lower leg portion 4a, an upper leg portion 4b which is generally parallel to leg portion 4a, a connecting portion 4c and raised portions 4d and 4e. Leg portions 4a, 4b and connecting portion 4c define a slot 10 which receives a shelf (not shown) therein. Upper leg portion 4b includes a pair of arms 4b' and 4b" defining a cut-out 12 within which the clamping member 6 is connected with the upper leg portion 4b via a pivot pin 14. The clamping member is held in the upright, clamping position by tightening the set screw 28 so that it protrudes through at least one raised portion of the body member and engages the clamping member 6. If desired, the grip of the set screw can be increased by beveling the tip of the set screw engaging the clamping member and/or by providing a depression in the clamping member to receive the set screw (not shown). The pencil sharpener 7 is connected with the upper end of the clamping member 6 such that said pencil sharpener is generally perpendicular to the length of the body member 4. When arranged in this manner, the clamp is ideally suited for placement on the edge of a shelf, desk top or other object.

Figure 2:
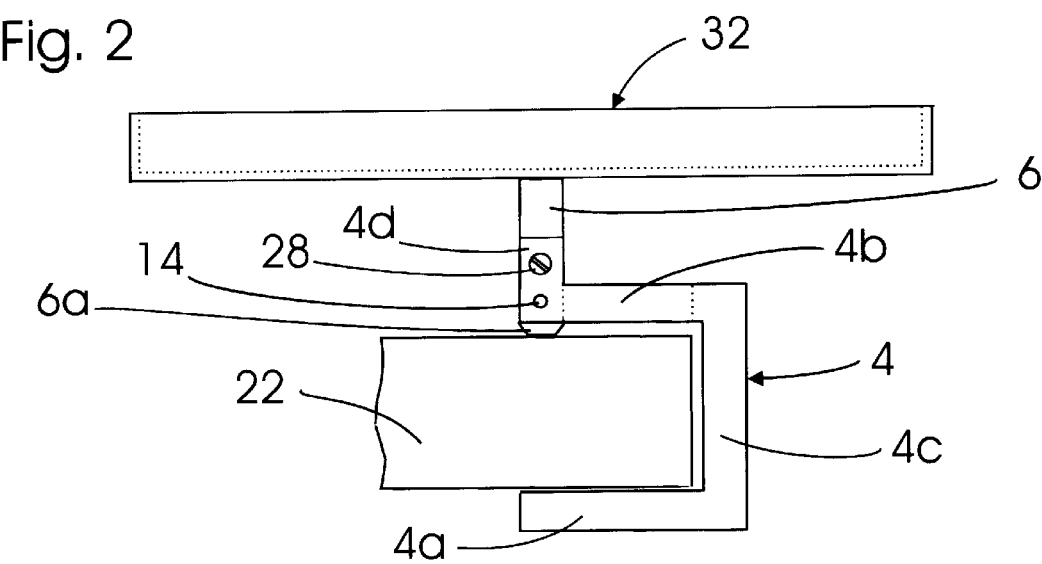
FIG. 2 is a side view of a clamp having a clamping member, a C-shaped body member, a set screw latch and a tray at the upper end of said clamping member.

FIG. 2 shows a clamp fastening a small shelf or tray 32 to a shelf 22. As in FIG. 1, the clamp has a body member 4 and a clamping member 6 and said clamping member is held in the upright clamping position by a set screw latch 28.

The use and operation of a clamping member to fasten a bookend, partition, or banding and/or binning to a shelf was disclosed in the U.S. Pat. No. 5,644,670 to Stuart. The operation of the lever clamp with a clamping member and set screw latch, e.g., as seen in FIGS. 1 and 2, can be summarized as follows: With the clamping member in the lowered, disengaged, or opened position, where said clamping member is approximately parallel to leg portions 4a and 4b, the body member 4 is placed on a shelf 22. Said body member is sized such that slot 10 is slightly larger than the thickness of said shelf and said shelf fits loosely within the slot. Once placed on the shelf, said clamping member is raised by hand to an intermediate position, whereby the lower end 6a of said clamping member extends into slot 10 and engages the upper surface of said shelf, thereby wedging the shelf between the lower end of the clamping member and the lower leg portion 4a of the body member. To facilitate installation, the lower end of said clamping member may be provided with beveled edges 6a. As the clamping member is raised to its fully upright or raised position, the body member 4 is pulled toward said shelf, thus forming a tight fit between the edge of said shelf and the body member and securely clamping the clamp to the shelf at a selected location. The clamping force generated by the clamping member is sufficient to firmly maintain the clamp on the shelf without marring or otherwise damaging the shelf. The clamping member is held in the upright, clamping position by tightening the set screw 28 so that it protrudes through at least one raised portion of the body member and engages the clamping member 6.

As disclosed for the clamping bookend in U.S. Pat. No. 5,644,670 to Stuart, it will be recognized that the clamping force for the clamping member in a lever clamp can be varied to avoid damaging the shelf by changing the length or rigidity of the lower end portion 6a of the clamping member. In addition, as with the clamping bookend, the clamping force can be increased by increasing the roughness of the clamping member surface which engages the shelf or by placing shims or pads between said lower end portion and the shelf or between the lower leg portion 4a of the body member and the shelf. As also noted in the above referenced patent for the clamping bookend, it will also be recognized that the clamp may be used in an inverted position, if desired.

Figure 3:
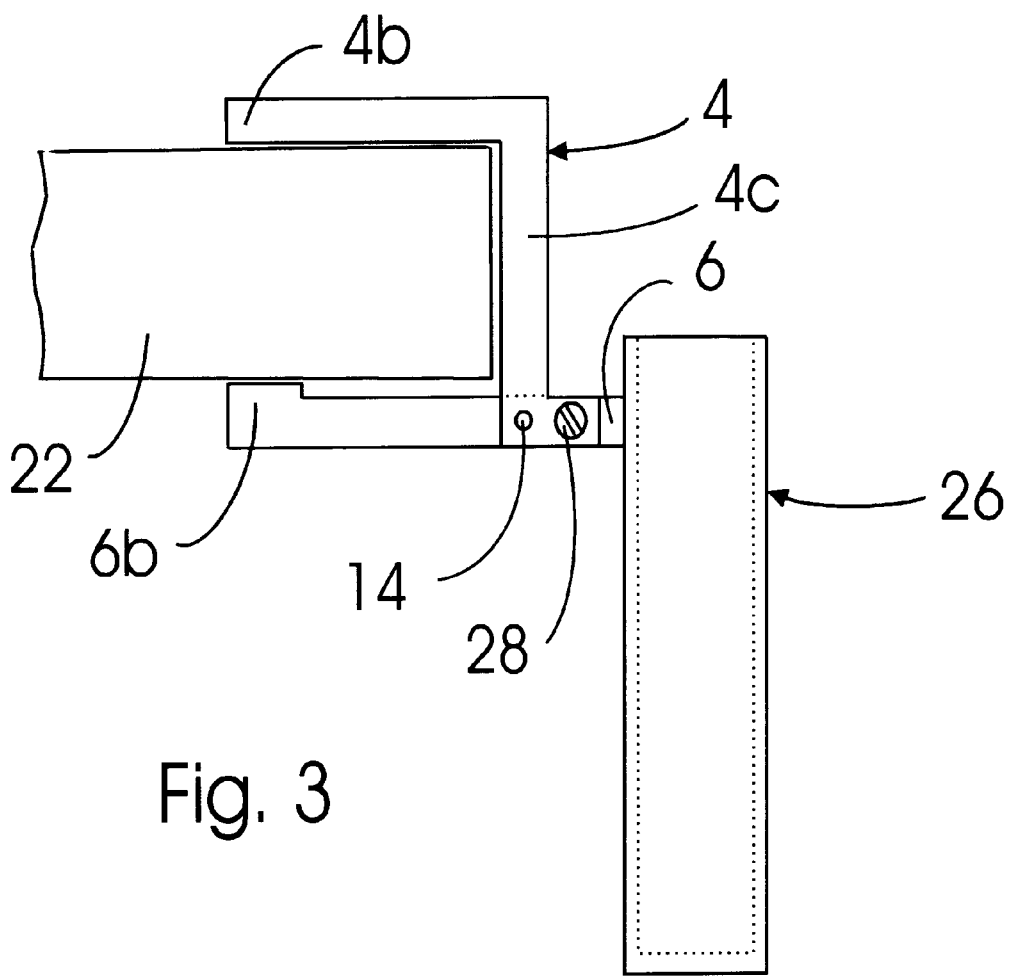

FIG. 3 shows a clamp fastening a dispenser 26 to a shelf 22. Such a dispenser might be used, for example, to distribute brochures, store coupons, or other objects in a retail setting. The clamp has a L-shaped body member 4, a clamping member 6 with a clamping foot portion 6b and a set screw latch 28, with the slot for receiving the shelf defined by the clamping member 6 and the upper leg portion 4b and connecting portion 4c of said body member. Said clamping foot portion concentrates the pressure exerted by said clamping member and thus helps provide a firm grip.

Figure 4:
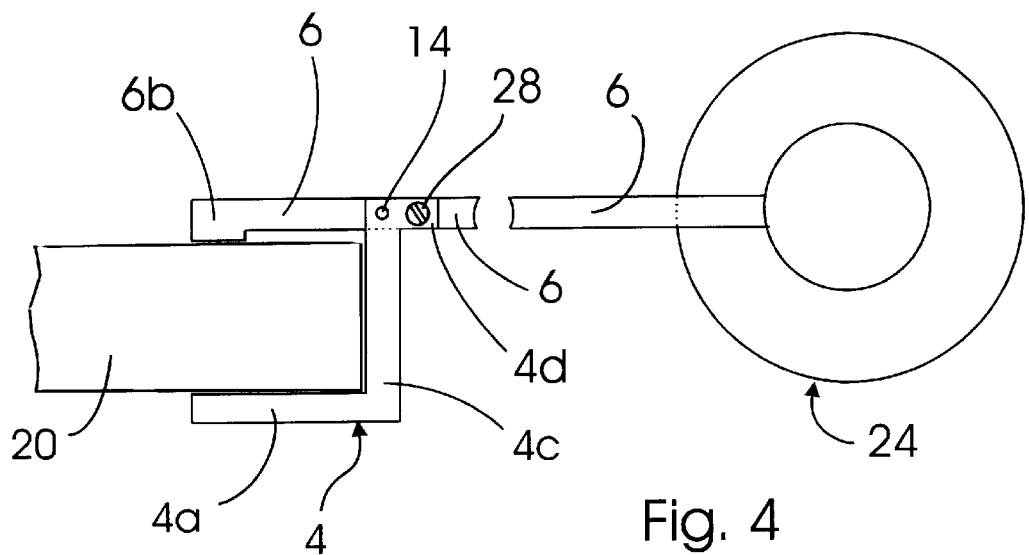
FIG. 4 is a top view of a clamp having a clamping member defining one side of the slot for receiving the vertical edge of the side of a bookcase, a L-shaped body member, a set screw latch and a lamp at one end of said clamping member.

FIG. 4 shows a clamp fastening a lamp 24 to a vertical edge of the side of a book case 20. As in FIG. 3, the clamp has a L-shaped body member 4, a clamping member 6 with a clamping foot portion 6b and a set screw latch 28. However, in FIG. 4, the slot for receiving the side of the bookcase is defined by the clamping member 6 and the lower leg portion 4a and connecting portion 4c of the body member 4.

Figure 5:
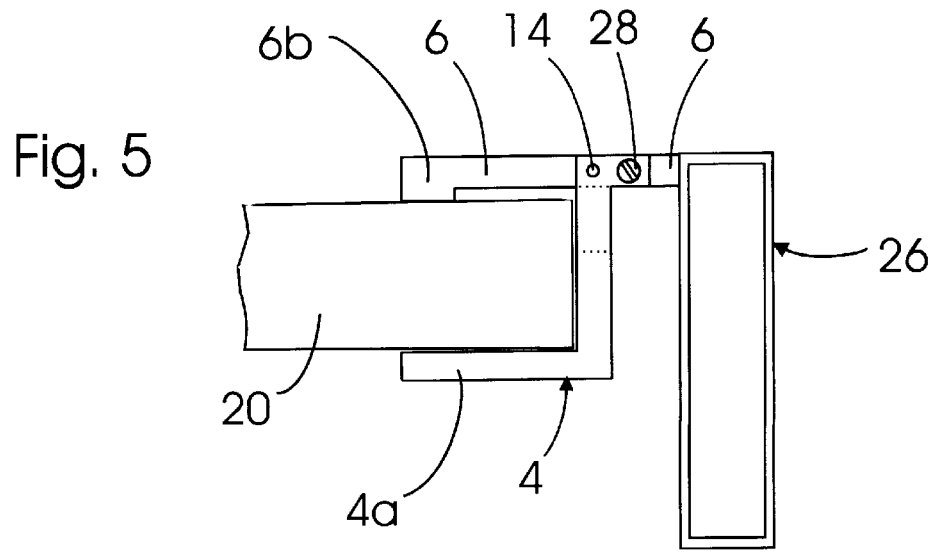
FIG. 5 is a top view of a clamp having a clamping member defining one side of the slot for receiving the vertical edge of the side of a bookcase, a L-shaped body member, a set screw latch, and a dispenser at one end of said clamping member.

FIG. 5 shows a clamp fastening a dispenser 26 to a vertical edge of the side of a book case 20. As in FIG. 4, the clamp has a L-shaped body member 4, a clamping member 6 with a clamping foot portion 6b and a set screw latch 28, with the slot for the side of the bookcase defined by the clamping member 6 and the lower leg portion 4a and connecting portion 4c of the body member 4.

Figure 6:
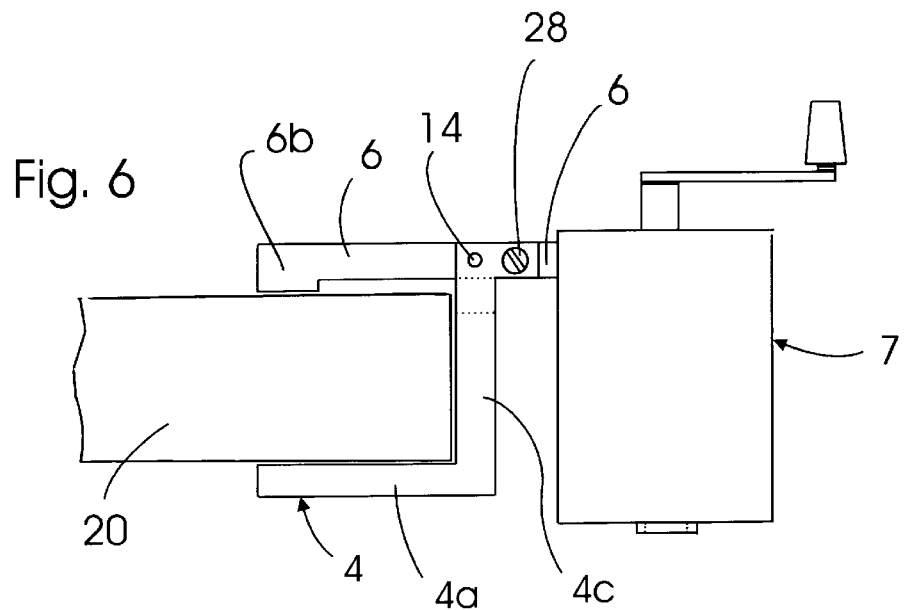
FIG. 6 is a top view of a clamp having a clamping member defining one side of the slot for receiving the vertical edge of the side of a bookcase, a L-shaped body member, a set screw latch and a pencil sharpener at one end of said clamping member.
Figure 7:
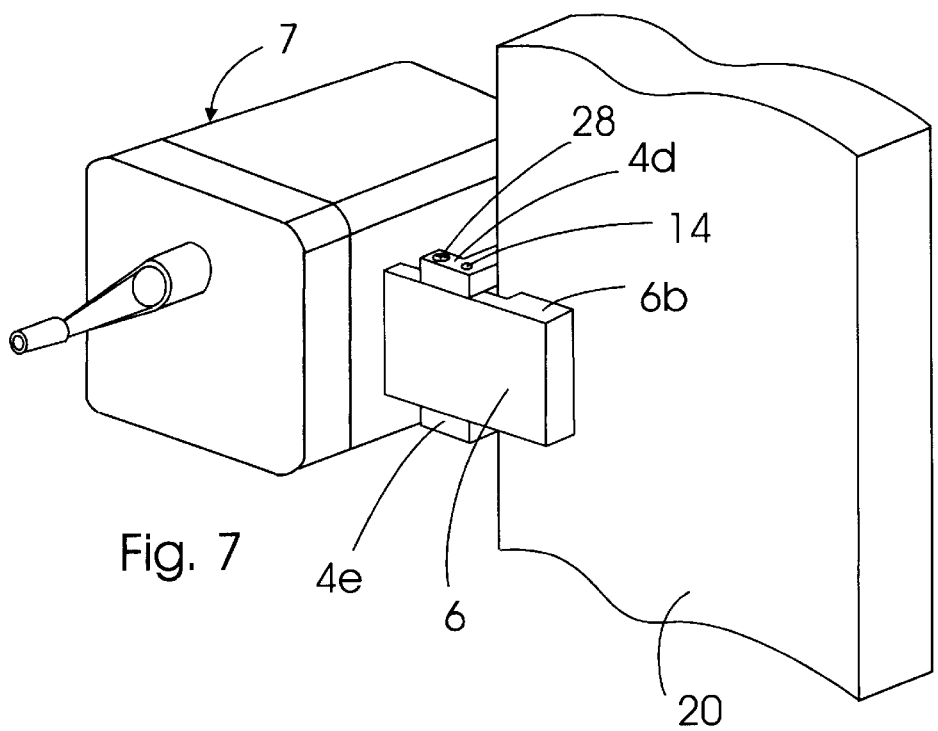
FIG. 7 is a rear perspective view of the clamp of FIG. 6.

FIGS. 6 and 7 show a clamp with a clamping member 6 fastening a pencil sharpener 7 to a vertical edge of the side of a book case 20. As in FIGS. 4 and 5, the clamp has a L-shaped body member 4, a clamping member 6 with a clamping foot portion 6b and a set screw latch 28, with the slot for the side of the bookcase defined by the clamping member 6 and lower leg portion 4a and connecting portion 4c of the body member.

Clamps with an L-shaped body member, e.g., as in FIGS. 3–7, are installed on a shelf as follows: Starting with the clamp in an opened position, said clamp is pressed against the edge of the shelf 22 or similar object. If the L-shaped body member has an upper leg portion 4b, then said upper arm is placed on the top of the edge of the shelf, with the connecting portion 4c pressed against the edge of said shelf. If the L-shaped body member has a lower leg portion 4a, then said lower arm is placed on the bottom of the edge of said shelf, again with the connecting portion pressed against the edge of said shelf. In either case, the clamping foot portion 6b is then pressed against the shelf either by direct pressure against said foot portion or by rotating the clamping member 6 via the pivot pin 14. Once said clamping foot portion is in the tightened or clamped position against the shelf, the set screw 28 is tightened to hold said clamping member and said clamping foot portion in place. In some applications, the weight of the object, e.g., a dispenser 26, at the other end of said clamping member helps hold said clamping foot portion against said shelf.

FIG. 8 shows a clamp having a clamping member 6 fastening a lamp 24 to a wire shelf 68. An adjustable swivel 62, at the upper end of said clamping member, is attached to a support extension 64 which attaches to said lamp. The clamp includes a body member 4 and a clamping member 6 with an extension 6c at the lower end of said clamping member. A set screw latch 28 is provided to retain the clamping member in the clamping upright position. Said extension and the lower leg portion 4a of the body member 4 are formed in a manner that they tightly grip at least one and preferably more than one of cross wires 68a or support wires 68b of the wire shelf 68 when the clamping member is in the tightened or clamped position. The grip on the wire shelf can be further increased, if desired, by increasing the surface area of said clamping member extension and/or said lower leg portion in contact with the wires of the wire shelf and/or by forming grooves in said lower leg portion and/or said extension that would receive said cross wires 68a and/or support wires (not shown).

FIG. 9 shows a clamping bookend supporting a book stop 8 as previously disclosed in the U.S. Pat. No. 5,644,670, to Stuart with a nib latch 24 also previously disclosed for the one-piece clamping bookend in the above referenced patent. In this embodiment, the clamping bookend includes a body member 4, a clamping member 6, and a stop member 8, with said nib latch serving to hold said clamping member in the tightened or clamped position.

Figure 10:
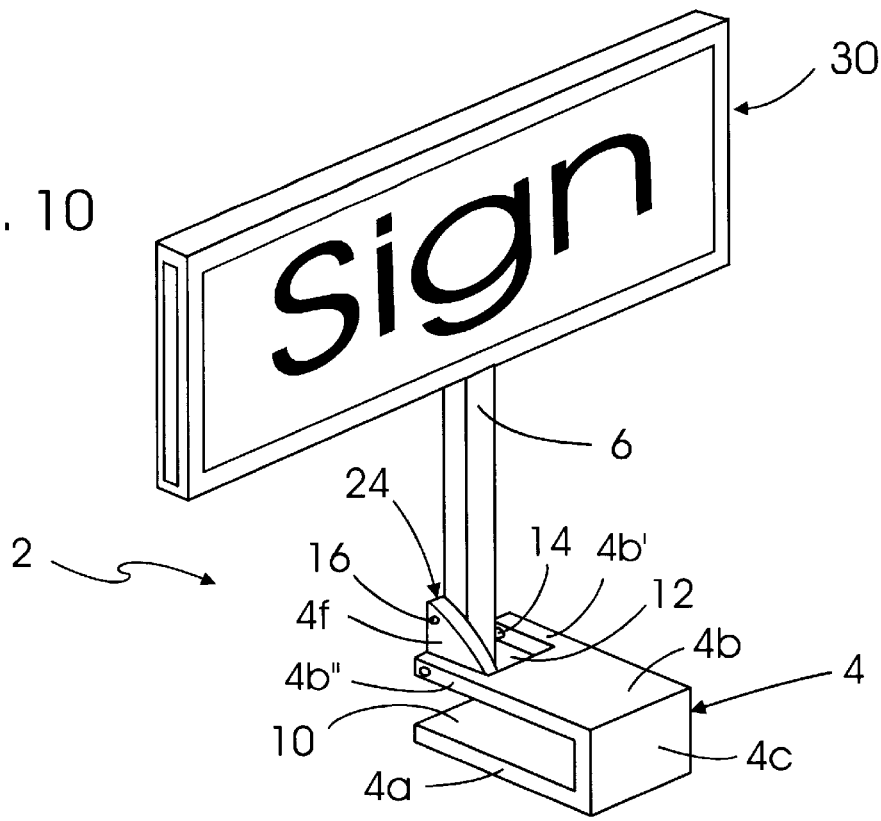
FIG. 10 is a front perspective view of a lever clamp having a clamping member, a nib latch, a C-shaped body member and a sign holder at the upper end of said clamping member.
Figure 11:
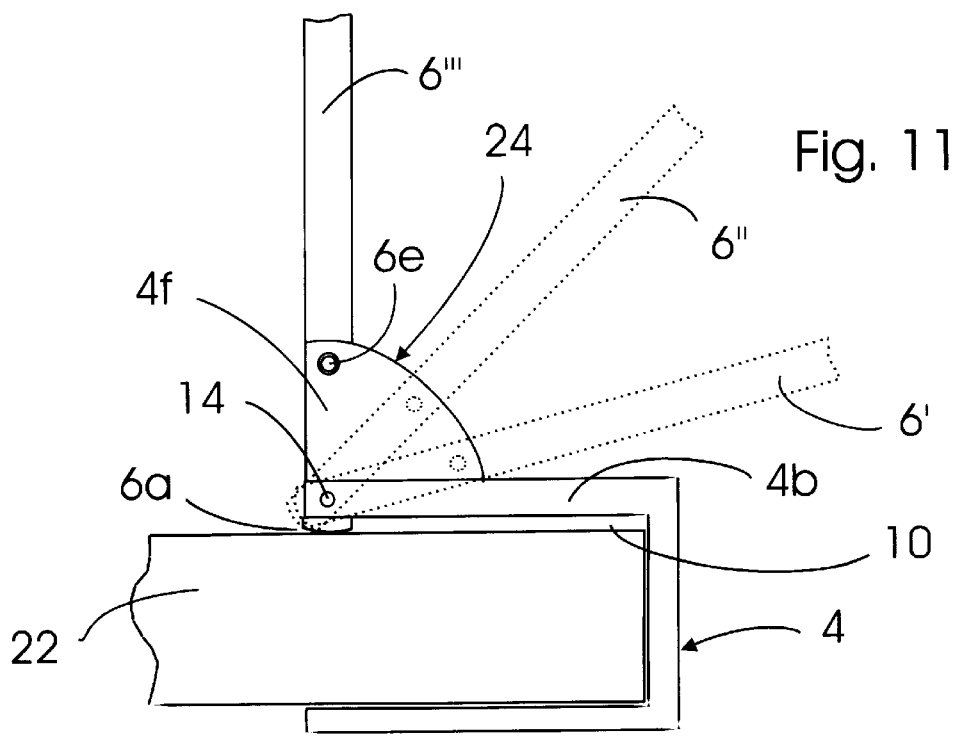
FIG. 11 is a side view of a clamp with a clamping member showing the operation of the nib latch.

The nib latch is suitable for use with many applications of the clamping bookend and lever clamp, including, as shown in FIG. 10, a clamp fastening a sign holder 30 to a shelf. As shown in FIGS. 9–11, said nib latch is formed of a protrusion or nib and a radius plate 4f. The radius plate 4f is normally biased inwardly in the direction of the clamping member 6 and nib. The radius plate is located above the upper leg portion 4a of the body member 4 and contains an opening 16 arranged to receive the nib when in alignment therewith.

The operation of the nib latch is shown in FIG. 11. With the clamping member in the lowered, disengaged, or opened position 6' shown in phantom, where the clamping member is nearly parallel to leg portions 4a and 4b, the body member 4 is placed on a shelf 22. The body member is sized such that slot 10 is slightly larger than the thickness of the shelf and the shelf fits loosely within the slot. The nib 6e presses against the radius plate 4f. Once placed on the shelf, the clamping member is raised by hand to an intermediate position 6", whereby the lower end 6a of the clamping member extends into slot 10 and engages the upper surface of the shelf 22, thereby wedging the shelf between the lower end of the clamping member and the lower leg portion 4a of the body member. To facilitate installation, the lower end of the clamping member may be provided with beveled edges 6a. As the clamping member is raised to its fully upright or raised position 6''', the nib continues to travel along the surface of the radius plate and the body member is pulled toward the shelf, thus forming a tight fit between the edge of the shelf and the body member and securely clamping the bookend to the shelf at a selected location. As the clamping member is raised to its fully upright or clamped position 6''', nib 6e and opening 16 become aligned, whereby the nib is biased outwardly through said opening, thereby locking the clamping member in the upright position. To release the clamping member, the clamping member is manually moved slightly away from the radius plate (or, alternatively, the radius plate is manually moved slightly away from the nib) until said nib clears said opening in the radius plate 4f, thereby allowing the clamping member to be lowered. The nib latch thus serves to lock the clamping member in its clamping or raised position.

Figure 12:
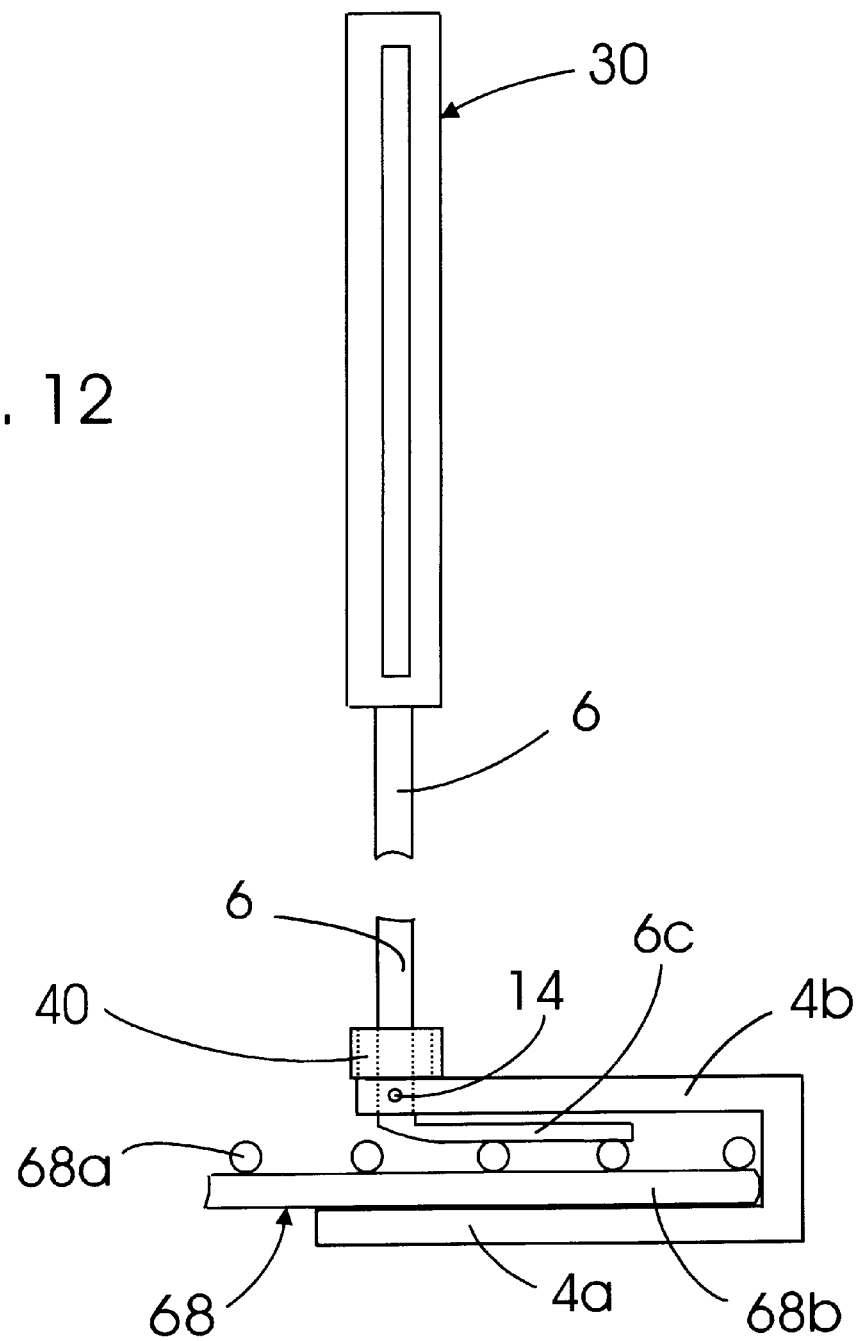
FIG. 12 is a side view of a lever clamp for a wire shelf having an extension at the lower end of the clamping member, a locking ring latch, and a sign holder at the upper end of said clamping member.

FIG. 12 shows another embodiment for latching the clamping lever 6 in the clamped upright position, i.e., a collar or locking ring 40. This figure shows a lever clamp with a clamping member 6 fastening a sign holder 30 to a wire shelf 68. The body portion of the clamp is provided with at least one raised portion that fits inside the locking ring when said ring is lowered on the clamping member (not shown). As in FIG. 8, an extension 6c is provided at the lower end of clamping member 6 to engage the wires of said wire shelf and thus allow the clamping member to press against said shelf as needed to provide a tight grip on the shelf.

Figure 13:
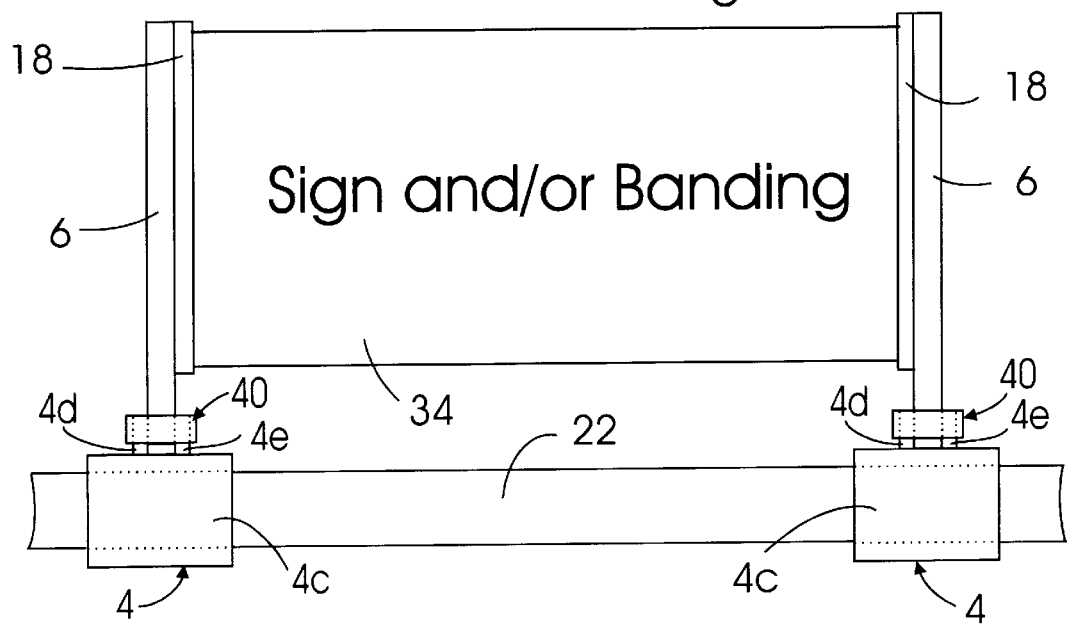
FIG. 13 is a front view of two clamping bookends having clamping members, locking ring latches and binding for supporting a banding and binning or a sign.

FIG. 13 shows two previously disclosed clamping bookends (U.S. Pat. No. 5,655,670 to Stuart) with previously undisclosed locking rings 40. The clamping bookends have a body portion 4 with raised portions 4d and 4e, a collar or locking ring 40, and a clamping member 6 with the upper portion having binding 18 for holding banding 36. Said locking rings are provided to retain said clamping members in the clamping upright position. If desired, the banding could do double duty as both a sign and as banding to retain objects on the shelf.

Figure 14:
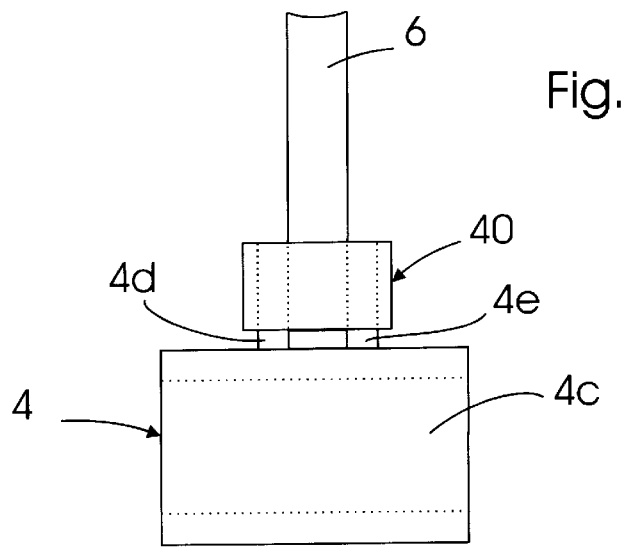
FIG. 14 is a front view of a clamp having raised body portions on the body member, a clamping member and a locking ring located on said clamping member.

As shown in FIG. 14, when the clamping member is in the upright clamping position, the locking ring 40 is positioned over the raised portions 4d and 4e so as to hold the clamping member in the raised clamping position. To release the clamping member, the locking ring is manually moved away from the raised portions 4d and 4e of the body member 4 until the locking ring clears said raised portions, thereby allowing the clamping member to be lowered. The operation of the locking rings is basically the same for both the lever clamp and the clamping bookend.

Figure 15:
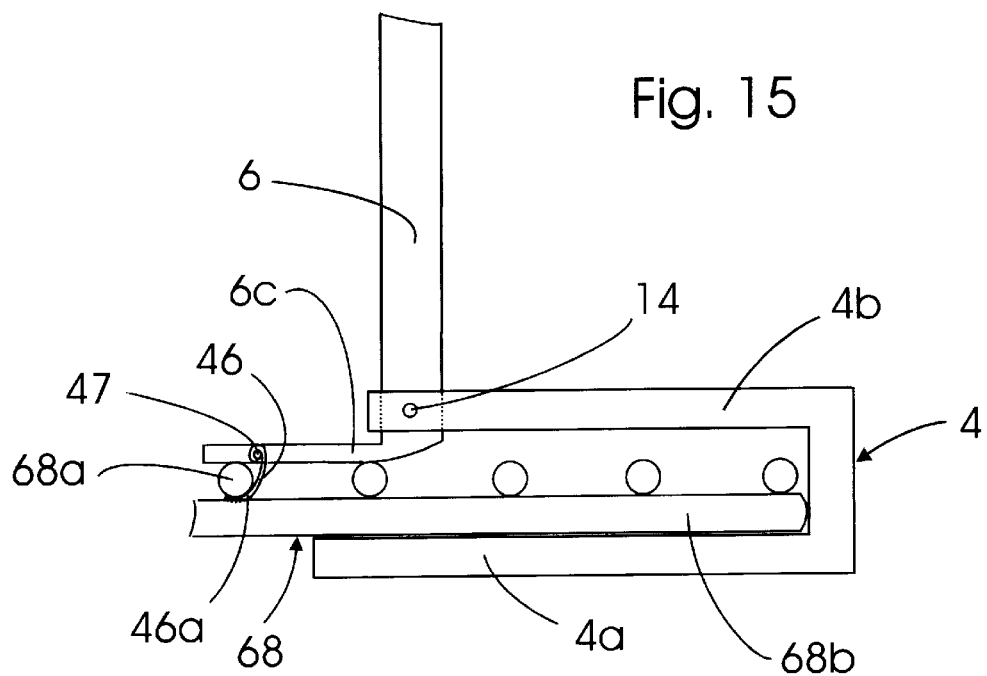
FIG. 15 is a side view of a clamp for a wire shelf having an extension at the lower end of the clamping member and a hook fastener between the wire shelf and said extension.

FIG. 15 shows yet another embodiment for latching the clamping member in the clamped position, i.e., a hook fastener 46. This figure shows a clamp for a wire shelf 68 with a clamping member 6 having an extension 6c at the lower end of the clamping member 6 and said hook fastener on said extension. The hook fastener serves to hold the clamping member in the clamped upright position. One or more hook fasteners 46 are attached to the extension 6c with a hook pivot pin 47 in such a manner that said hook fastener can be rotated manually around said hook pivot pin so that the hook 46a engages the cross wire 68a of the wire shelf, and thus latches the clamping member in the upright clamping position. As in FIGS. 8 and 12, the extension 6c serves to help grip the wire shelf. Said clamping member extension and the lower leg portion 4a of the body member 4 are formed in a manner that they are able to engage at least one and preferably more than one of the wires of the wire shelf, to allow the clamping member to tightly grip the wire shelf when raised to the active or clamping position. To release the clamping member, said hook fastener is manually rotated away from said cross wire of said wire shelf so that said hook clears said cross wire, thereby allowing said clamping member to be lowered. The hook fastener is formed so as to firmly but reversibly engage the cross wire.

Figure 16:
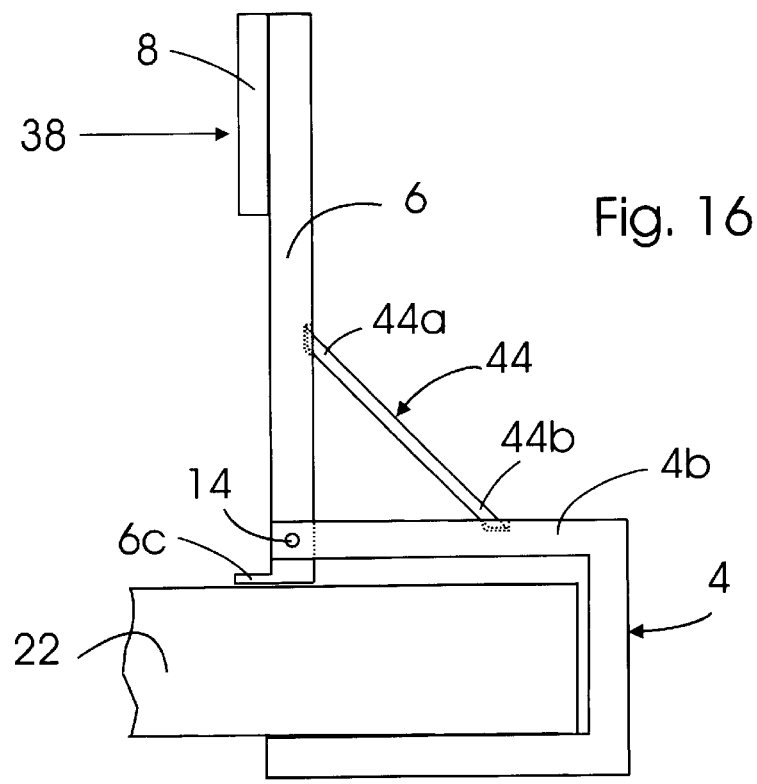
FIG. 16 is a side view of a clamping bookend having an extension at the lower end of the clamping member and a brace between said clamping member and the body member.

FIG. 16 shows yet another embodiment for latching the clamping member. 6 in the clamped or upright position, i.e., a brace. This figure shows a previously disclosed clamping bookend (U.S. Pat. No. 5,644,670 to Stuart) with a previously undisclosed extension 6c at the lower end of clamping member 6 and brace 44 between the clamping member 6 and the upper leg portion 4b of the body member 4. Said extension serves to prevent said clamping member from rotating forward, i.e., toward the load 38, if the clamp is placed so that stop member 8 does not abut the side of a book or other object on the shelf. Said brace prevents rotation in the opposite direction, i.e., in the direction of the load and thus said extension and said brace work together to hold said clamping member in the tightened clamped position. If desired, one of the two ends 44a or 44b of said brace can be connected to said clamping member or said upper leg portion with a pivot pin or other means (not shown). To release said clamping member, said clamping member is manually moved slightly toward the load so that one or both ends of said brace can be moved away from the openings in said clamping member and/or said body member, thereby allowing the clamping member to be lowered.

FIG. 17 shows a clamp with a yet another latch to hold the clamping member in the clamped position. In this case, the latch is formed of a cylindrical portion 6d of the clamping member 6 and a curved arm portion 4g in the upper leg portion 4b. Said cylindrical portion basically serves as an enlarged version of a pivot pin and is provided for one or both sides of said clamping member 6. This cylindrical portion includes a notch 6d' that, when said clamping member is in the upright clamping position, receives a protrusion 4g' from said curved arm portion of the upper leg portion (of course, the notch and protrusion could be reversed, with the notch in the curved arm portion and the protrusion on the cylindrical portion). Said curved arm portion is biased downward toward said cylindrical portion and, when the clamping member is rotated to the upright clamping position, said protrusion firmly engages said notch and thus holds the clamping member in the upright clamping position. To release said clamping member, said curved arm portion is manually moved slightly away from the cylindrical portion until said protrusion clears said notch, thereby allowing said clamping member to be lowered.

Sheet metal shelves are generally formed with a wide edge portion formed by bending the shelf material. Therefore, if a lever clamp is to be used with such shelves, it is necessary to ensure that said clamp can still have a good grip on the shelf even though the wide edge of the shelf prevents the lower leg portion of the body member from directly contacting the bottom of the shelf body.

FIG. 18 shows a clamping bookend as disclosed in the U.S. Pat. No. 5,655,670 to Stuart with the addition of a large pad 78 to allow use with a sheet metal shelf. Said pad is placed between the lower leg portion 4a of the body member and the metal shelf 76. The use of a pad to ensure a good fit for a clamping bookend was disclosed in the U.S. Pat. No. 5,655,670 to Stuart and the use of a large pad with a metal shelf and screw fastener clamp was disclosed in the U.S. patent application Ser. No. 09/137,891 by Stuart. Said large pad allows the use of the clamping bookend or lever clamp with sheet metal shelves having a typical wide edge portion formed by a shelf body portion 76a, a front bend portion 76b and a front bend curl portion 76c. The pad thus ensures that the clamping bookend and the lever clamp can still have a good grip on the shelf even though the wide edge of the shelf prevents the lower leg portion of the body member from directly contacting the bottom of the shelf body. The pad, which is formed of rigid material such as metal, wood, or plastic, can be a separate movable piece, or, if desired, can be mounted with adhesive or other means to the lower portion of the metal shelf body 76a. The binding 18 receives banding and/or binning (not shown) which is placed in the binding after installation of the body member 4 and clamping member 6 and serves to hold the banding and/or binning in an upright position relative to the shelf along the front or sides thereof.

The use of a pad 78 allows the lever clamp and clamping bookend to be used to fasten a variety of objects to metal shelves. FIG. 19 shows a lever clamp with a body member 4, clamping member 6, a pivot pin 14, a pad 78, and a set screw latch 28 fastening a dispenser 26 to a metal shelf 76.

Also, FIG. 20 shows a lever clamp with a body member 4, clamping member 6, a pivot pin 14, a pad 78, and a set screw latch 28 fastening a lamp 24 to a metal shelf 76.

In addition, FIG. 21 shows a lever clamp with a body member 4, clamping member 6, a pivot pin 14, a pad 78, and a set screw latch 28 fastening a sign holder 30 to a metal shelf 76.

FIG. 22 shows an alternative approach for using a clamping bookend with a typical metal shelf. In this embodiment, the clamping bookend disclosed in the U.S. Pat. No. 5,655,670 to Stuart is provided with a previously undisclosed locking spacer arm 60, formed of rigid material such as metal, wood or plastic, and fastened to the lower leg portion 4a through a spacer pivot pin 66. The spacer arm 60 is formed of a latch portion 60c, a connecting shaft portion 60b, and a shelf-engaging pad portion 60a. The spacer pivot pin passes through the lower leg portion 4a of the body member 4, the latch portion 60c of the spacer arm 60 and a conventional helical spring (not shown). The spring serves to hold the latch portion 60c in close contact with the lower leg portion of the body member 4.

FIG. 23 shows the operation of the spacer arm 60 with a lever clamp. With the clamping member 6 in the lowered, disengaged, or opened position where the clamping member is nearly parallel to leg portions 4a and 4b, the body member 4 is placed on a metal shelf 76. The body member is sized such that slot 10 is slightly larger than the thickness of the front bend 76b of the metal shelf and the metal shelf fits loosely within the slot. The spacer arm is in the open or unlocked position shown in phantom 60'. Once placed on the shelf, the spacer arm is rotated to the locked position 60" so that the shaft portion 60b is perpendicular to the lower leg portion 4a, the pad portion 60a engages the metal shelf body portion 76a and the latch portion 60c is above the lower leg portion 4a. The latch portion 60c is formed so as to protrude over the top of the lower leg portion 4a when in the locked position and thus prevent rotation of the spacer arm 60. The latch portion 60c is held against the lower leg portion 4a by the spring on the spacer pivot pin 66. To complete installation, the clamping member is raised by hand whereby the lower end 6a of the clamping member extends into slot 10 and engages the metal shelf body 76a, thereby wedging said shelf body between the lower end of the clamping member and the spacer arm 60. As the clamping member is raised to its fully upright or raised position, the connecting body member 4c is pulled toward the front bend 76b of the metal shelf 76, thus forming a tight fit between the metal shelf and the body member and securely clamping the clamp to the shelf at a selected location. To release the lever clamp, the clamping member 6 is manually rotated to the lowered position and the spacer arm 60 is manually moved away from the lower leg portion 4a to compress the spring on the spacer pivot pin 66 until the latch portion 60c clears the lower leg portion 4a, thereby allowing said spacer arm to be rotated to the open or unlocked position 60' and the removal of the lever clamp.

An alternative approach for using a clamp with a metal shelf was disclosed in the U.S. patent application Ser. No. 09/137,891 by Stuart. This included using a screw fastener and a body member formed so as to generally conform to the shape of the edge of a metal shelf. It will be recognized that a similar approach would also be suitable for a clamp with a clamping member (not shown).

Figure 24:
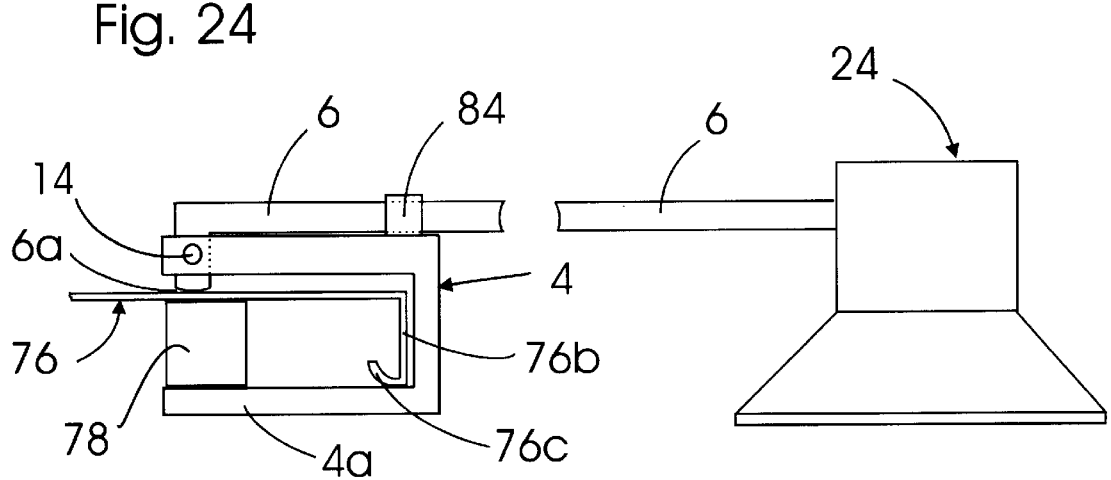
FIG. 24 is a side view of a clamp for a metal shelf having a clamping member formed so as to provide a tight grip when parallel to the length of the body member, a clip latch, and a lamp.
Figure 25:
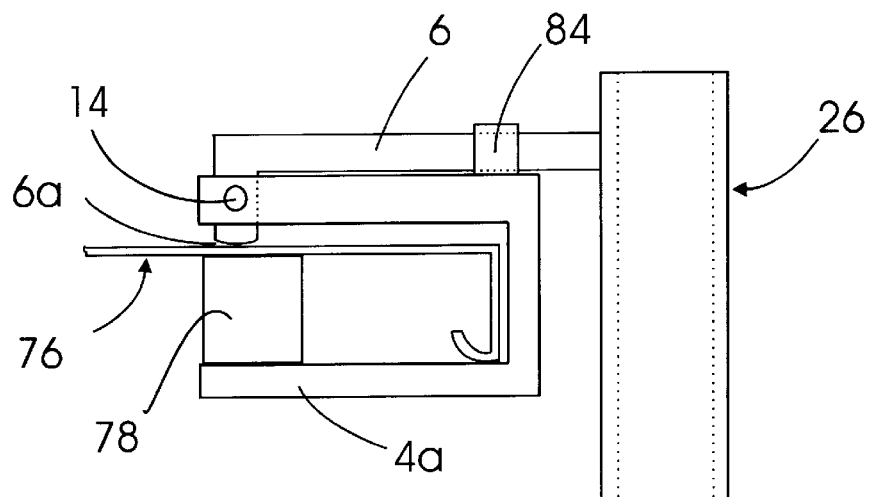
FIG. 25 is a side view of a clamp for a metal shelf having a clamping member formed so as to provide a tight grip when parallel to the length of the body member, a clip latch, and a dispenser.

FIGS. 24 and 25 shown yet another embodiment, i.e., a clip latch, for latching the clamping member in the clamping position. FIG. 24 shows a clamp with a clamping member 6 parallel to the length of the body member and a clip latch 84 fastening a lamp 24 to a typical metal shelf 76. FIG. 25 shows a similar clamp with a clamping member 6 parallel to the length of the body member fastening a dispenser to a typical metal shelf 76. In FIGS. 24 and 25, the clamp includes a body member 4, pin pivot 14, clip latch 84 and a clamping member 6 with said clamping member formed so as to provide a tight grip when parallel to the length of the body member 4. The clamping member is held in the clamping position by said clip latch, which reversibly grips the clamping member. In some applications, the weight of the item, e.g., a lamp, at the end of the clamping member also tends to hold the clamping member in the clamped position.

Several embodiments for latching the clamping member in the clamped or upright position are disclosed for the clamping bookend in the U.S. Pat. No. 5,655,670 to Stuart. Additional embodiments for latching the clamping member of the lever clamp or the clamping bookend in the clamped or upright position include the use of a separate locking pin through the opening in the radius plate 4f shown in FIG. 9 and into the clamping member 6 (not shown), or a separate locking pin through one or both of the raised portions 4d and 4e of the body member 4 and into the clamping member 6 (not shown) or a separate locking pin through the curved arm portion 4g of the body member 4 shown in FIG. 17 and into the cylindrical portion 6d of the clamping member (not shown). In addition, an incline or raised portion can be provided on the radius plate 4f shown in FIGS. 9–11 so that the nib travels up the incline or along the raised portion as the clamping member 6 is raised to the upright clamping position and then leaves the incline or raised portion to return to the surface of the radius plate so as to lock the clamping member in place when the clamping member is in the full upright position (not shown). Also, a thumb screw (not shown) could be used in place of the set screw in the set screw latch 28.

It will be recognized that the latches shown above are generally suitable for use with the lever clamp disclosed herein and the clamping bookend disclosed in the U.S. Pat. No. 5,655,670 to Stuart.

FIG. 26 shows a lever clamp having a clamping member 6 with a flex portion 36 at its lower end. Said clamping member also has lower 72 and upper 70 connections for a large sign such as a banner. A flex member was disclosed for the clamping bookend in U.S. Pat. No. 5,655,670 to Stuart. The flex member 36 is formed as an integral part of said clamping member but may also be a separate component connected with said clamping member. Once the clamp has been installed on the shelf, flex member 36 serves to transmit a load 38 applied to the clamping member 6 to the shelf 22 via pivot pin 14. Thus, the greater the horizontal load applied to the clamping member, the greater the clamping force applied to the shelf, and the greater the clamping force applied to the shelf, the less likely the clamp will slide off of the shelf.

FIG. 27 shows a clamping bookend having a partitioning divider 42 on the upper end of the clamping member 6 and an flex portion 36 at the lower end of the clamping member as disclosed in the U.S. Pat. No. 5,655,670, to Stuart but with said flex portion oriented generally perpendicularly to the partitioning divider and the length of the body member 4. Said flex portion is formed with a beveled edge 36' on the side of said flex portion closest to the opening of slot 10 to allow the initial installation of the bookend on the shelf. As said bookend is placed on the shelf, said clamping member is brought to the upright position, said beveled edge engages the edge of said shelf and, as manual pressure is applied, said bookend slides onto said shelf. When said clamping member is in its raised position, the load applied to said partitioning divider from the books or other objects on said shelf is transmitted both through said flex portion to the shelf and through said clamping member, pivot pin 14 and said body member to said shelf. This embodiment may be compared with the clamping bookend with a stop and flex member disclosed in the U.S. Pat. No. 5,655,670, to Stuart in which said flex member is oriented parallel to the body member. Unlike the situation with a stop, the force on the partitioning divider is not transmitted exclusively through the pivot to the flex portion to the shelf, since the pivot, in this case, is generally oriented in parallel to the direction of the force. Instead, a portion of the force against said partitioning divider is transmitted through said pivot pin to the upper leg portion 4b of body member 4, which tends to rotate or twist said body member and thus the upper and lower leg portions tend to press into said shelf. The perpendicular orientation of the flex portion to the length of the body member shown in FIG. 27 is preferable for a partitioning divider, since said load is more efficiently transmitted to the shelf without excessive rotation of said body member.

FIG. 28 shows a clamping bookend 65 formed of a single piece of wire or similar material with a brace latch portion 65i and book stop 65g. Said brace latch portion extends from said stop portion to a raised U-shaped portion 65b'. In this embodiment, a clamping portion 65f reversibly presses against the shelf 22 and is held in the tightened or clamped position by said brace latch portion, which also provides support against the load 38. The slot for receiving the shelf 22 is formed of an upper leg portion 65*b*, a connecting portion 65*c*, a lower leg portion 65*a* and a foot portion 65*d*. These clamps also include an integral hinge portion 65*b*" and a brace latch opening 66. The free end of said brace latch portion is oriented perpendicularly to said raised U-shaped section and thus can be inserted into said latch opening. Said U-shaped portion is shaped so that said brace latch portion does not slip out of the latch opening when under load. The integral hinge portion may not be required in some applications, since the grip may be satisfactory in the absence of said integral hinge portion. This clamp is suitable for heavy loads and provides a strong reversible grip on the shelf. Said brace latch portion thus both holds said clamping portion in the locked position and braces said clamping portion against said load.

FIG. 29 shows a lever clamp 74 formed of a single piece of wire or similar material. This clamp is similar to the clamping bookend shown in FIG. 28 but is provided with a shaft portion 74*h* with an upper 70 and lower 72 connection for supporting the ends of a large sign such as a banner. In this case, the brace latch 74*i* extends from the clamping portion 74*f* to the raised U-shaped portion 74*b*' portion. As in FIG. 28, a clamping portion 74*f* reversibly presses against the shelf 22 and is held in the tightened or clamped position by a brace latch portion 75*i*, which also provides support against the load 38. The slot for receiving the shelf 22 is formed of an upper leg portion 74*b*, a connecting portion 74*c*, a lower leg portion 74*a* and a foot portion 74*d*. These clamps also include an integral hinge portion 74*b*" and a brace latch opening 66. The free end of said brace latch portion is oriented perpendicularly to said raised U-shaped section and thus can be inserted into said latch opening. Said U-shaped portion is shaped so that said brace latch portion does not slip out of the latch opening when under load. The integral hinge portion may not be required in some applications, since the grip may be satisfactory in the absence of said integral hinge portion. This clamp is also suitable for heavy loads and provides a strong reversible grip on the shelf. Said brace latch portion thus both holds said clamping portion in the locked position and braces said clamping portion against said load.

The wire clamping bookend 65 shown in FIG. 28 and the wire lever clamp 74 shown in FIG. 29 are reversibly installed in a very similar manner. For the clamping bookend 65, installation involves placing the foot portion 65*d* against the edge of the shelf 22 and manually moving the clamping portion 65*f*, upper leg portion 65*b* and stop portion 65*g* away from the lower leg portion 65*a* through a reversible flexing of the connecting portion 65*c* so as to increase the size of the slot 10 and allow said wire clamp to be pressed onto the shelf 22. Said clamping portion and said stop portion are then pressed forward toward the load 38 so as to rotate these portions around the integral hinge 65*b*" and thus press the lower section of the clamping portion 65*f* against said shelf. The free end 65*i*' of the brace latch portion 65*i* is then inserted into the brace opening 66 formed by the raised U-shaped section 65*b*' of said upper leg portion. As noted above, the brace latch portion 65*i* both holds the clamping portion against the shelf 22 and braces the stop portion and clamping portion against the load 38. The wire clamping bookend is removed by manually moving said clamping portion and said stop portion slightly toward said load, then by manually removing the free end of said brace latch portion from said latch opening, followed by manually rotating the clamping portion and stop portion away from said load so as to move the lower portion of said clamping portion away from said shelf and allow the wire clamping bookend to be removed.

While FIGS. 1, 2 and 8–27 show a C-shaped body member and FIGS. 3–7 show an L-shaped body member, it will be recognized that both types of clamp body are suitable for firmly and reversibly fastening items such as lamps, sign holders, trays, book stops, pencil sharpeners, and dispensers to objects such as shelves, bookcases and desktops.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. A clamp which can be securely mounted along a shelf or similar object, comprising:
    (a) a body member containing a slot for receiving the shelf; and
    (b) at least one clamping member pivotally connected with said body member for movement between a lowered disengaged position and a raised clamping position, said clamping member including an upper portion for supporting items selected from the group consisting of lamps, dispensers, sign holders, pencil sharpeners, trays, and signs, and said clamping member also including a lower portion extending into said slot when said member is in the raised position, said clamping member lower portion wedging against the shelf within said slot as said clamping member is pivoted to the raised position to securely clamp said body member to the shelf at a selected position thereon.

2. The clamp of claim 1, wherein said body member has a C-shaped configuration and includes a pair of generally parallel spaced leg portions and a connecting portion defining said slot, and further wherein said clamping member is connected with one of said leg portions.

3. The clamp of claim 2, and further comprising a pad between a lower of said leg portions and a sheet metal shelf to help ensure gripping to said metal shelf.

4. The clamp of claim 1, and further comprising latching means for retaining said clamping member in the raised clamping position.

5. The clamp of claim 1, wherein said clamping member lower portion comprises a flex portion which wedges against the shelf when said clamping member is in the raised position and which extends inwardly with respect to said slot, whereby a clamping force generated by the clamping member on the shelf increases as said clamping member pivots beyond the raised position.

6. The clamp of claim 1, and further comprising an extension on a lower end of said clamping member which engages one or more wires of a wire shelf so as to allow gripping to said wire shelf.

7. The clamp of claim 1, wherein said body member has a L-shaped configuration and includes a leg portion and a connecting portion defining two sides of said slot, with a remaining side of said slot defined by said clamping member and further wherein said clamping member is connected with said connecting portion.

8. The clamp of claim 7, wherein said clamping member includes a portion for supporting items selected from the group consisting of sign holders, lamps, dispensers, trays, signs, pencil sharpeners, book stops, partitions and banding and binning, and said clamping member also includes a clamping foot portion extending into said slot when said member is in the clamped position, said clamping foot portion wedging against the shelf or similar object within said slot as said clamping member is pivoted to the clamped position to securely clamp said body member to the shelf at a selected position thereon.

9. The clamp of claim 7, and further comprising latching means for retaining said clamping member in the raised clamping position.

10. A one-piece clamp which can be securely mounted along a shelf or similar object, comprising:

(a) a body portion containing a slot for receiving the shelf, said body portion having a C-shaped configuration and including a pair of generally parallel spaced legs and a connecting portion defining said slot;

(b) at least one flexible hinge portion extending from one of said legs;

(c) at least one clamping portion extending from said hinge portion for movement between a lowered disengaged position and a raised clamping position, said clamping portion including an upper portion for supporting items selected from the group consisting of sign holders, trays, signs, pencil sharpeners, lamps, dispensers, book stops, partitions and banding and binning, and a lower portion extending into said slot when said clamping portion is in the raised position, said clamping portion lower portion wedging against the shelf within said slot as said clamping portion is pivoted to the raised position to securely clamp said body portion to the shelf at a selected position thereon; and (d) at least one brace latch extending from said clamping portion to one of said legs and serving to hold said clamping portion in the clamped position and to brace said clamping portion against a load.

* * * * *